(12) United States Patent
Ziegler et al.

(10) Patent No.: US 10,592,509 B2
(45) Date of Patent: Mar. 17, 2020

(54) DECLARATIVE RULES FOR OPTIMIZED ACCESS TO DATA

(71) Applicant: SAP SE, Walldorf (DE)

(72) Inventors: Torsten Ziegler, Dielheim (DE); Christian Hansen, Heidelberg (DE); Frank-Martin Haas, Dielheim (DE); Stefan Baeuerle, Rauenberg (DE); Mihnea Andrei, Issy les Moulineaux (FR); Alexander Boehm, Schwetzingen (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 15/601,815

(22) Filed: May 22, 2017

(65) Prior Publication Data

US 2018/0253473 A1    Sep. 6, 2018

Related U.S. Application Data

(60) Provisional application No. 62/465,357, filed on Mar. 1, 2017.

(51) Int. Cl.
*G06F 16/00* (2019.01)
*G06F 16/2453* (2019.01)
*G06F 16/2455* (2019.01)

(52) U.S. Cl.
CPC .. *G06F 16/24537* (2019.01); *G06F 16/24564* (2019.01)

(58) Field of Classification Search
CPC ...... G06F 16/245; G06F 16/288; G06F 9/546; G06F 16/221; G06F 16/2282; G06F 16/2365; G06F 16/2445
See application file for complete search history.

(56) References Cited

U.S. PATENT DOCUMENTS

| | | | |
|---|---|---|---|
| 5,544,355 A * | 8/1996 | Chaudhuri | ........ G06F 16/24542 |
| 7,191,160 B2 | 3/2007 | Hoeft et al. | |
| 7,325,233 B2 | 1/2008 | Kuck et al. | |
| 7,392,236 B2 | 6/2008 | Rusch et al. | |
| 7,421,437 B2 | 9/2008 | Hoeft et al. | |
| 7,457,828 B2 | 11/2008 | Wenner et al. | |
| 7,461,097 B2 | 12/2008 | Stahl et al. | |
| 7,480,681 B2 | 1/2009 | Fecht et al. | |
| 7,490,102 B2 | 2/2009 | Ivanova et al. | |

(Continued)

*Primary Examiner* — Truong V Vo
(74) *Attorney, Agent, or Firm* — Fish & Richardson P.C.

(57) ABSTRACT

The present disclosure involves systems, software, and computer implemented methods for using declarative rules for optimized access to data. One example method includes receiving a structured query language (SQL) query, the SQL query associated with at least one database table and at least one predicate. A determination is made as to whether the SQL query is associated with at least one declarative rule based on the at least one database table and the at least one predicate. In response to determining that the SQL query is associated with at least one declarative rule, the at least one associated declarative rule is applied, during optimization of the SQL query. The at least one declarative rule defines a transformation to the SQL query to be performed during query optimization. An updated SQL query is generated based on the applied at least one associated declarative rule and the updated SQL query is provided.

20 Claims, 7 Drawing Sheets

(56) References Cited

U.S. PATENT DOCUMENTS

| | | |
|---|---|---|
| 7,519,614 B2 | 4/2009 | Glania et al. |
| 7,565,443 B2 | 7/2009 | Rossmanith et al. |
| 7,571,164 B2 | 8/2009 | Kuersch et al. |
| 7,587,705 B2 | 9/2009 | Benjes et al. |
| 7,631,303 B2 | 12/2009 | Debertin et al. |
| 7,634,771 B2 | 12/2009 | Benjes et al. |
| 7,647,251 B2 | 1/2010 | Baeuerle et al. |
| 7,665,063 B1 * | 2/2010 | Hofmann ............... G06F 8/311 717/111 |
| 7,669,181 B2 | 2/2010 | Benjes et al. |
| 7,702,696 B2 | 4/2010 | Ziegler et al. |
| 7,774,319 B2 | 8/2010 | Schweigkoffer et al. |
| 7,788,319 B2 | 8/2010 | Schmidt et al. |
| 7,797,708 B2 | 9/2010 | Weber et al. |
| 7,844,659 B2 | 11/2010 | Baeuerle et al. |
| 7,934,219 B2 | 4/2011 | Baeuerle et al. |
| 8,005,779 B2 | 8/2011 | Baeuerle et al. |
| 8,108,433 B2 | 1/2012 | Baeuerle et al. |
| 8,108,434 B2 | 1/2012 | Schlarb et al. |
| 8,315,988 B2 | 11/2012 | Glania et al. |
| 8,356,056 B2 | 1/2013 | Schlarb et al. |
| 8,392,573 B2 | 3/2013 | Lehr et al. |
| 8,413,150 B2 | 4/2013 | Lu et al. |
| 8,429,668 B2 | 4/2013 | Kowalkiewicz et al. |
| 8,484,167 B2 | 7/2013 | Glania et al. |
| 8,489,640 B2 | 7/2013 | Schlarb et al. |
| 8,504,980 B1 | 8/2013 | Kraft et al. |
| 8,612,927 B2 | 12/2013 | Brunswig et al. |
| 8,683,436 B2 | 3/2014 | Baeuerle et al. |
| 8,694,557 B2 | 4/2014 | Thimmel et al. |
| 8,719,826 B2 | 5/2014 | Baeuerle et al. |
| 8,751,437 B2 | 6/2014 | Teichmann et al. |
| 8,762,408 B2 | 6/2014 | Brand et al. |
| 8,819,075 B2 | 8/2014 | Schlarb et al. |
| 8,856,727 B2 | 10/2014 | Schlarb et al. |
| 8,863,005 B2 | 10/2014 | Lehr et al. |
| 8,886,596 B2 | 11/2014 | Effern et al. |
| 8,892,667 B2 | 11/2014 | Brunswig et al. |
| 8,924,565 B2 | 12/2014 | Lehr et al. |
| 8,938,645 B2 | 1/2015 | Schlarb et al. |
| 8,949,789 B2 | 2/2015 | Schlarb et al. |
| 9,009,708 B2 | 4/2015 | Lu et al. |
| 9,020,881 B2 | 4/2015 | Ritter et al. |
| 9,021,392 B2 | 4/2015 | Baeuerle et al. |
| 9,038,021 B2 | 5/2015 | Schlarb et al. |
| 9,176,801 B2 | 11/2015 | Baeuerle et al. |
| 9,182,994 B2 | 11/2015 | Schlarb et al. |
| 9,189,520 B2 | 11/2015 | May et al. |
| 9,244,697 B2 | 1/2016 | Schlarb et al. |
| 9,354,948 B2 | 5/2016 | Baeuerle et al. |
| 9,361,407 B2 | 6/2016 | Hutzel et al. |
| 9,378,233 B2 | 6/2016 | Lee et al. |
| 9,430,523 B2 | 8/2016 | Falter et al. |
| 9,442,977 B2 | 9/2016 | Falter et al. |
| 9,507,810 B2 | 11/2016 | Baeuerle et al. |
| 9,513,811 B2 | 12/2016 | Wein et al. |
| 9,575,819 B2 | 2/2017 | Baeuerle et al. |
| 9,619,552 B2 | 4/2017 | Falter et al. |
| 9,639,567 B2 | 5/2017 | Lee et al. |
| 9,639,572 B2 | 5/2017 | Hutzel et al. |
| 2005/0052150 A1 | 3/2005 | Bender |
| 2006/0248507 A1 | 11/2006 | Benjes et al. |
| 2006/0248545 A1 | 11/2006 | Benjes et al. |
| 2010/0070336 A1 | 3/2010 | Koegler et al. |
| 2012/0310926 A1 * | 12/2012 | Gannu ............... G06Q 30/02 707/723 |
| 2014/0324917 A1 | 10/2014 | Haas et al. |
| 2015/0046413 A1 | 2/2015 | Mihnea et al. |
| 2015/0347410 A1 | 12/2015 | Kim et al. |

\* cited by examiner create filter rule CreationDateAgeFilter
    on ORDERS( CRTDATE )
    apply on CRTDATE >= ?
    with relaxed predicate matching
    set filter value = CRDATE
    apply as '_DATAAGING >= ? or _DATAAGING = ''00000000''' select ... from ORDERS where CRTDATE >= '20140101' select ... from ORDERS where
    ( ORDERS.CRTDATE >= '20140101' and
      ( ORDERS._DATAAGING >= '20140101' or
        ORDERS._DATAAGING = '00000000' ) )

FIG. 3

SELECT ... FROM ORDER_DATA
*604*

WHERE MODEL = 'XYZ' AND (ORDER_DATE > '20130101' AND ORDER_DATE < '20161231')
*608*

*606*

*600*

SELECT ... FROM ORDER_DATA

WHERE MODEL = 'XYZ' AND (ORDER_DATE > '20140101' AND ORDER_DATE < '20161231')
*610*

DECLARATIVE RULES FOR OPTIMIZED ACCESS TO DATA

CLAIM OF PRIORITY

This application claims priority under 35 USC § 119(e) to U.S. Patent Application Ser. No. 62/465,357, filed on Mar. 1, 2017, the entire contents of which are hereby incorporated by reference.

TECHNICAL FIELD

The present disclosure relates to computer-implemented methods, software, and systems for using declarative rules for optimized access to data.

BACKGROUND

A query optimizer can analyze multiple query plans that can be performed to execute a received user query. The query optimizer can determine and select a best performing query plan. A query plan can be represented as a tree that includes a set of nodes. Each node of the tree can represent an operation to perform when the query is executed. Query plans can vary in estimated performance, such as due to differences in join ordering and other differences.

SUMMARY

The present disclosure involves systems, software, and computer implemented methods for using declarative rules for optimized access to data. One example method includes receiving a structured query language (SQL) query, the SQL query associated with at least one database table and at least one predicate. A determination is made as to whether the SQL query is associated with at least one declarative rule based on the at least one database table and the at least one predicate. In response to determining that the SQL query is associated with at least one declarative rule, the at least one associated declarative rule is applied, during optimization of the SQL query. The at least one declarative rule defines a transformation to the SQL query to be performed during query optimization. An updated SQL query is generated based on the applied at least one associated declarative rule and the updated SQL query is provided.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates a filter creation statement that can be used to define a filter to transform a user query into an updated query.

FIGS. 4-6 illustrate user queries that are transformed into updated queries using respective filters.

DETAILED DESCRIPTION

Declarative rules can be used by a database system to optimize received queries. The database system can determine that a received query matches a defined declarative rule, based on a match between a query table and predicate referenced in the query with a declarative rule table and predicate referenced in the declarative rule. The declarative rule can be applied, during optimization of the query, to increase efficiency of the query. For example, additional predicate(s) can be added to the query that result in a smaller data set to search. An updated, enhanced query can be provided to a query execution engine, for more efficient query execution as compared to the original query.

The declarative rules represent rules defined by experts having domain knowledge that exists before queries are received and executed. In particular, the declarative rules can be defined in a manner to identify and focus queries to a specific set of data or locations where the original query may specify wider pools of data and/or tables than necessary to achieve the results desired. When a query with certain restrictions on certain attributes is received, a declarative rule is identified that matches the predicate(s) of the query. Once identified, the declarative rule is applied during query optimization to combine the user restrictions with additional restrictions known from the domain knowledge. Based on the application of the declarative rule, more focused queries are generated such that a search area or set associated with the query is smaller than originally requested, accelerating the returned results due to the focused search and increased efficiency of the underlying system, including saving system resources and clock cycles, among others. Increased efficiency is particularly useful when some tables/pools of data that can be excluded reside on storage media that are expensive to access (e.g. remote systems or slow storage media like disk or tape drives).

Figure 1:
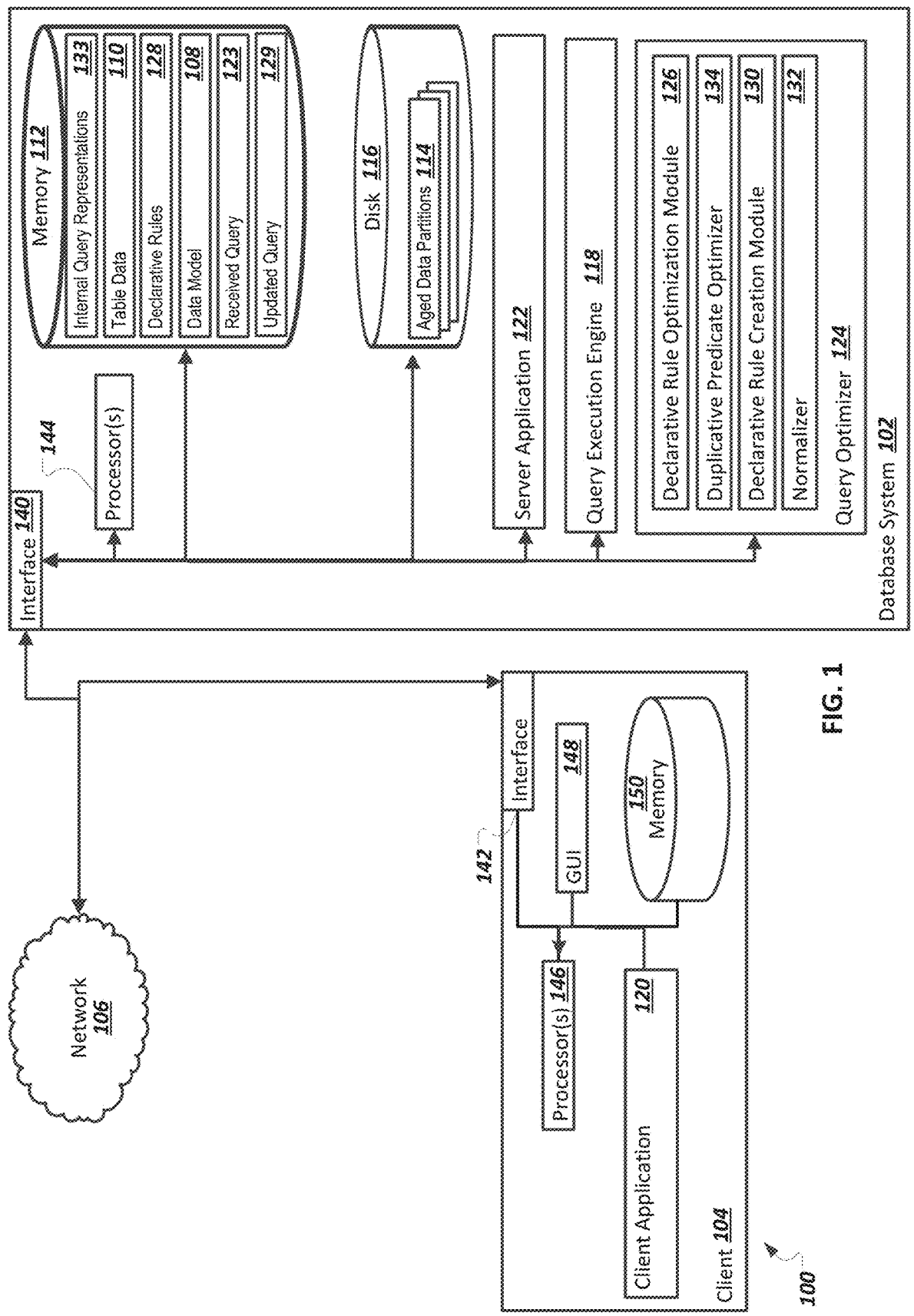
FIG. 1 is a block diagram illustrating an example system for using declarative rules for optimized access to data.

FIG. 1 is a block diagram illustrating an example system 100 for using declarative rules for optimized access to data. Specifically, the illustrated system 100 includes or is communicably coupled with a database system 102, a client device 104, and a network 106. Although shown separately, in some implementations, functionality of two or more systems or servers may be provided by a single system or server. In some implementations, the functionality of one illustrated system or server may be provided by multiple systems or servers.

The database system 102 includes a data model 108 that describes a set of tables and relationships between tables. In some implementations, table data 110 is stored in memory 112. The table data 110 can include current data used by the database system 102. Aged, historical data can be stored in one or more aged data partitions 114 in disk storage 116.

A query execution engine 118 can execute queries received, for example, from a client application 120 running on the client device 104 or from a server application 122 (which may be running on the database system 102 or on another machine). A received query 123 can be received and stored in the memory 112, for example. Before the received query 123 is executed, a query optimizer 124 can optimize the received query 123 to make the received query 123 more efficient with regards to processing time, resource access (e.g., memory, disk), or other performance optimizations.

Among other optimizations, the query optimizer 124 can use a declarative rule optimization module 126 to optimize the received query 123 based on one or more declarative rules 128. A declarative rule 128 can be defined by an application developer, an administrator, or some other user who has domain knowledge related to the data model 108. A declarative rule can be used to augment the received query 123 with additional information that makes the received query 123 more precise or efficient based on the domain knowledge. An updated query 129 can include one or more predicates included in the received query 123 and additional added predicate(s) based on one or more declarative rules. As described in more detail below, a declarative rule can be a filter rule or a join rule.

As an example, the data model 108 can include information about automobiles. The received query 123 can include a predicate specifying a particular engine type. A domain expert may know that certain makes or models of automobiles are the only automobiles that include certain types of engines. The domain expert can define one or more declarative rules that map out the domain knowledge of engine types and automobile makes and models. The declarative rule optimization module 126 can, when receiving the received query 123 that includes the predicate specifying the particular engine type, update the received query 123 with additional predicates that direct the query execution module to only search for makes of automobiles that are associated with that engine type. In some cases, the declarative rule may add a predicate that only requests the data associated with those particular makes of automobiles. In other instances, the declarative rule may add a predicate (or modify an existing predicate) to search particular tables where information on the makes of those automobiles are known to be. The declarative rule can filter the search within a particular identified table or can add or change the tables to be searched in addition to or instead of those included in the received query 123.

The updated query 129 can be executed more efficiently with regards to an amount of data accessed, or particular memory 112 or disk 116 areas that are accessed, which can improve performance. The updated query 129 can be a more intelligent query that uses less resources that the received query 123. The updated query 129 can be more precise and operate on a smaller problem space, with a smaller set of data being searched.

As another example, data can be stored in different locations or machines, and the updated query 129 can include information that specifies which locations or machines to search, based on declarative rules that specify which data is stored at which locations or machines. For example, an administrator can be aware of different topologies and physical layouts of data, and can define declarative rules that optimize queries based on such knowledge. In one instance, while data for all car makes may be stored in a single set of table(s), in some examples, data from different car makes may be stored in different tables or locations, and the declarative rule can be used to add information to the received query, to generate the updated query 129, to optimally search tables or locations that are known to include data relevant to the received query 123.

In another example, where the aged data partitions 114 include aged data, processing of a user query may involve searching both the current data in the table data 110 and the aged data partitions 114 to find data requested by the query (other queries may only search current data in the table data 110). In some instances, the table data 110 and data in the aged data partitions 114 can include a technical data aging column (i.e., where technical fields are invisible to end users) which indicates whether a respective data set is stored in the aged data partitions 114. A declarative rule can be defined based on domain knowledge that indicates data cannot be aged before it is created. If the received query 123 includes a predicate for data newer than a given creation date, a declarative rule is identified and then applied during optimization to update the received query 124, to generate the updated query 129, to also filter data based on a data aging value that is also newer than the given creation date. Such a declarative rule can result in the searching of data aging partitions 114 that may actually include requested data, and the pruning or removal of older data aging partitions 114 from the query parameters that have been determined, based on the declarative rule, to not include requested data. A data aging example is described in more detail below with respect to FIG. 2.

Declarative rules can be used to increase efficiency of queries rather than or in addition to other approaches, such as approaches that analyze statistics about instances of data in the table data 110 or the aged data partitions 114. Data can include anomalies such as data entry or formatting errors, which can prevent a data analyzer from identifying rules about data relationships that might actually exist in the domain knowledge of a system. For example, conceptually, every record that has a value of "X" for a field "Y" may have also have a value of "A" for a field "B", but an analyzer may not be able to determine that relationship if the data includes anomalies such as extra or varying formatting in character string fields, for example. Declarative rules can be used to establish conceptual, domain-level constraints that may or may not be exactly reflected in the database data.

As another example, certain car models may generally not be sold in a particular country. However, exception cases may exist where occasionally cars are sold in that country, with such exception cases being represented in database tables. Users of an application may not care about the exception cases, so an application developer may configure a declarative rule so that received queries for those car models are updated to not search records associated with the country.

A declarative rule creation module 130 can enable a domain expert to define a declarative rule, such as by using the client application 120 or another client application running on the client device 104 or another client device (e.g., an administrator client device), as well as via connection to the database system 102 locally or through network 106. As mentioned, the domain expert can be an application developer, an administrator, or another type of user. An administrator may have knowledge about data organization, across machines, partitions, or locations, for example. As another example, an application developer may have domain knowledge specific to a particular application. Declarative rules can augment application code and can be used throughout the application. Declarative rules defined by a particular developer can be used in multiple portions of an application that have been written by multiple developers. The other application developers do not need to understand, know about, or manually configure the domain knowledge incorporated into the declarative rules defined by the particular developer in order to have their application components benefit from the increased query performance resulting from application of the declarative rules defined by the particular developer. In other words, declarative rules can be transparent to other developers and users and/or applications who submit queries to the database system 102.

Declarative rules can be shipped with an application, or can be added after an application has been shipped. Declarative rules can be defined using a DDL (Data Definition Language) or any other suitable format, including those requiring additional interpretation and formatting by the query optimizer 124. In some implementations, the DDL is an extension to an existing language, such as SQL (Structured Query Language). Developers and domain experts who define declarative rules may already know SQL, and the DDL can include similar syntax as SQL, which can enable users to write declarative rules in the DDL without having to learn new syntax rules of a new, different language. The developers and domain experts can define declarative rules that can become an extension to the data model 108. The declarative rules 128 can combine with the data model 108 to form an extended data model.

As described below, the query optimizer 124 can use the declarative rule optimization module 126 as part of standard optimization of the received query 123. Standard optimization can include other optimizations, such as normalizations performed by a normalizer 132, which can include generation of internal query representations 133. A query that has been updated by the declarative rule optimization module 126 can be further optimized after declarative rules have been applied. For example, a duplicative predicate optimizer 134 can remove duplicate or overlapping predicates that may exist in the query after predicates have been added due to declarative rules 128 associated with the original query. In some instances, the declarative rule optimization module 126 may be executed multiple times, such as where a first declarative rule applied to an original query generates an updated query. The declarative rule optimization module 126 can evaluate the updated query 129 to determine if another declarative rule 128 applies to the updated query 129. Depending on the effects of particular declaration rules 128 on the queries, multiple applications of declarative rules 128 may be required.

As used in the present disclosure, the term "computer" is intended to encompass any suitable processing device. For example, although FIG. 1 illustrates a single database system 102 and a single client device 104, the system 100 can be implemented using a single, stand-alone computing device, two or more database systems 102, or two or more clients 104. Indeed, the database system 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database system 102 and the client device 104 may be adapted to execute any operating system, including Linux, UNIX, Windows, Mac OS®, Java™, Android™, iOS or any other suitable operating system. According to one implementation, the database system 102 may also include or be communicably coupled with an e-mail server, a Web server, a caching server, a streaming data server, and/or other suitable server.

Interfaces 140 and 142 are used by the database system 102 and the client device 104, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 128, 126, and 130 may each comprise software supporting one or more communication protocols associated with communications such that the network 106 or interface's hardware is operable to communicate physical signals within and outside of the illustrated system 100.

The database system 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the database system 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database system 102 includes the memory 112. In some implementations, the database system 102 includes multiple memories. The memory 112 may include any type of memory or database module and may take the form of volatile and/or non-volatile memory including, without limitation, magnetic media, optical media, random access memory (RAM), read-only memory (ROM), removable media, or any other suitable local or remote memory component. The memory 112 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database system 102. As illustrated, memory 112 includes internal query representations 133, table data 110, declarative rules 128, the received query 123, the updated query 129, and the data model 108.

The client device 104 may generally be any computing device operable to connect to or communicate with the database system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 120. A client application is any type of application that allows the client device 104 to request and view content on the client device 104. In some implementations, a client application can use parameters, metadata, and other information received at launch to access a particular set of data from the database system 102. In some instances, a client application may be an agent or client-side version of the one or more enterprise applications running on an enterprise server (not shown).

The client device 104 further includes one or more processors 146. Each processor 146 included in the client device 104 may be a central processing unit (CPU), an application specific integrated circuit (ASIC), a field-programmable gate array (FPGA), or another suitable component. Generally, each processor 146 included in the client device 104 executes instructions and manipulates data to perform the operations of the client device 104. Specifically, each processor 146 included in the client device 104 executes the functionality required to send requests to the database system 102 and to receive and process responses from the database system 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 148.

The GUI 148 of the client device 104 interfaces with at least a portion of the system 100 for any suitable purpose, including generating a visual representation of the client application 120. In particular, the GUI 148 may be used to view and navigate various Web pages. Generally, the GUI 148 provides the user with an efficient and user-friendly presentation of business data provided by or communicated within the system. The GUI 148 may comprise a plurality of customizable frames or views having interactive fields, pull-down lists, and buttons operated by the user. The GUI 148 contemplates any suitable graphical user interface, such as a combination of a generic web browser, intelligent engine, and command line interface (CLI) that processes information and efficiently presents the results to the user visually.

Memory 150 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 150 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the database system 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
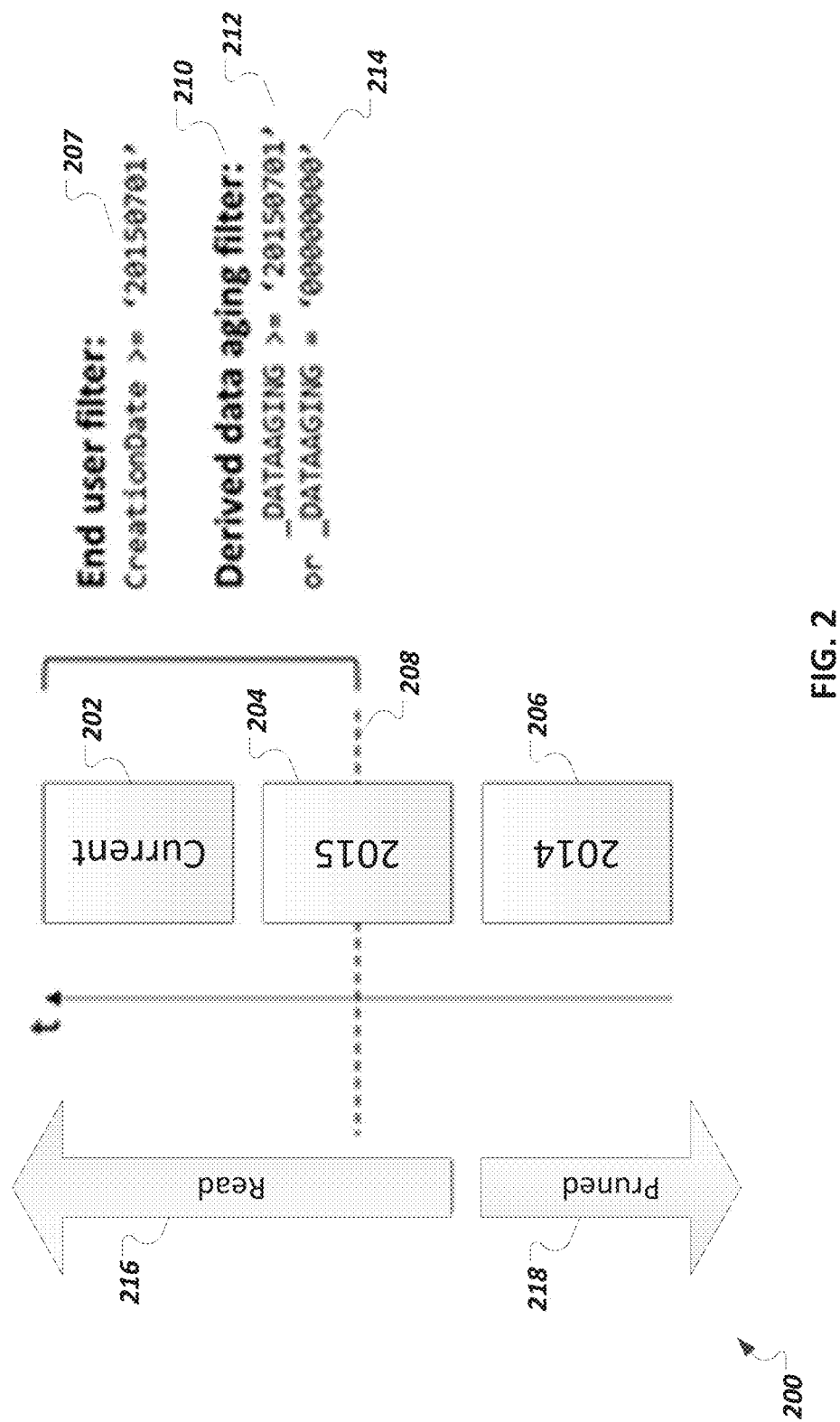
FIG. 2 is a diagram illustrating using filter rules for data aging.

FIG. 2 is a diagram 200 illustrating using filter rules for data aging. A filter rule is a type of declarative rule that is applied when a user query includes a certain type of predicate on a certain type of table. A database system can store current data 202 (e.g., in memory), and historical data (e.g., on disk or another location separate from the current data 202), such as in a first partition 204 that includes data from year 2015 and a second partition 206 that includes data from year 2014. The partitions 204 and 206 can store aged (e.g., archived) data. The current data 202 can be data that has not been aged. Data in the current data 202 can include a null value (e.g., '00000000') for a technical DATAAGING column that is used to mark whether data has been aged, with the null value indicating that the current data 202 has not been aged.

A query with a predicate 207 of "CreationDate>='20150701'" can be received, such as from a user. Line 208 illustrates a position in the partition 204 that corresponds to the date specified in the predicate 207. A determination can be made that a declarative rule applies to the query, such as based on a table name included in the query matching a table name included in the declarative rule and a predicate included in the declarative rule matching the predicate 207. Application of the declarative rule can result in a filter 210 being added to the query. The filter 210 can include a first predicate 212 of "_DATAAGING>='20150701'" that includes a date corresponding to the date in the predicate 207. The filter 210 includes a second predicate 214 of "DATAAGING='00000000', joined with an OR operator to the predicate 212, to indicate that the current data 202 is to be searched.

The filter 210 can be added to the predicate 207 to optimize the query. An effect of adding the filter 210 to the predicate 207 is that the partition 204 and the current data 202 can be read (as illustrated by a read symbol 216) when processing the query while the partition 206 (and any other older partitions) can be pruned (e.g., not read) during the processing of the query (e.g., as illustrated by a pruned symbol 218). Use of the declarative rule can result in less data being read (e.g., partitions that are known to not include data relevant to the query can be pruned from query processing (e.g., not read)), resulting in a saving of processing time and resources.

In general, a database system may use data aging to reduce a memory footprint of business applications, reduce a system load, and speed up transactions in an OLTP (OnLine Transaction Processing) environment. Data aging can introduce challenges for queries that need a consistent view of the entire data, such as built-in analytics and external consumers. For these consumers it may not be sufficient to only read current data, but it may be necessary to also read historical data to get complete and correct results. Without the use of declarative rules, access to historical data can be inefficient because the database system may not otherwise know how to prune uninteresting historical partitions. Data may be aged object-wise according to business lifecycle states, and such information may not be explicitly represented in columns of all participating tables. The technical data aging column can be used to indicate whether a record of a table belongs to an aged business object. The content of the technical data aging column can be hard to describe to end users and may therefore be left unexposed to end users. As a result, end user queries may not have a natural filter criterion on the data aging column that would allow the database system to decide which partitions can be pruned.

To help with partition pruning, the database system can be provided with filter criteria on the data aging column, using declarative rules, as shown in FIG. 2. The filter criteria on the data aging column can be derived from filter criteria that are provided by the end user, based on the declarative rules. The translation of end user filter criteria to filter criteria on the data aging column can be done without the involvement of application code changes, based on rules that are derived from knowledge about the data aging logic and that are applied during query optimization or otherwise prior to query execution. Filter rules (e.g., a declarative rule set) can be declared on (or associated with) a database table and enhance the database system with the capability to process the declarative rules during optimization. The database optimizer can derive restrictions on the data aging column directly from the provided business-relevant filter criteria of the SQL query.

Data aging rules can represent domain knowledge that records are not aged before they are created, as discussed above. Therefore, it can be sufficient to only look at data where the data aging column contains the same or newer date than the end user restriction on the entry creation date. Other data aging domain knowledge rules can exist. For example, a domain expert can know that entries that are not closed are never aged. Accordingly, a declarative rule can be defined to direct the database system to only search current data when the end user restricts a query to open items. As another example, a domain expert can know that certain company codes are never aged. Accordingly, a declarative rule can be defined to direct the database system to only search current data for those company codes.

FIG. 3 illustrates a filter creation statement 300 that can be used to define a filter to transform a user query 302 into an updated query 304. The filter creation statement 300 includes a filter name 306 of "CreationDateAgeFilter". The filter creation statement 300 includes a table name 308 of "ORDERS" and a column name 310 of "CRTDATE" which specifies a table and a column, respectively, that a user query is to include to have the filter applied. Filter creation statements can be defined for one, or multiple tables. An apply-on clause 312 include a predicate 314 of "CRTDATE>=?" that specifies a further condition for when the filter is to be applied to a query. The predicate 314 includes a parameter 316 which can match a given literal date that is included with a "CRTDATE>=" expression in a user query. An apply-as clause 318 includes a compound predicate 320 to apply (e.g., add) to a matching user query. A value in the user query that corresponds to the parameter 316 is inserted into the compound predicate 320 in place of a parameter 322.

The user query 302, when received, can match the created filter, due to a predicate 324 in the user query 302 matching the predicate 314 in the apply-on clause 312, and a column name 326 and a table name 328 matching the column name 310 and the table name 308, respectively. A date literal 329 is included in the predicate 324 and corresponds to the parameter 316.

Application of the filter to the user query 302 can result in the updated query 304. The updated query 304 includes a predicate 330 corresponding to the predicate 324 in the user query 302 and a compound predicate 332 corresponding to the compound predicate 320. A date literal 334, corresponding to the parameter 322, has been inserted into the compound predicate 332 as a copy of the date literal 329.

A filter creation statement can refer to a sub query. A sub query can describe data to be retrieved that is to be used in a declarative rule. For example, a configuration table can be used to store information that indicates when fiscal years begin and end for various companies or sub organizations of a company. Financial data can be stored in other database tables, and/or in aged data partitions, by calendar year. If a query is received for financial data according to a fiscal year, a declarative rule can be used to specify which calendar year partitions or tables to search. The declarative rule can include a sub query that looks up a mapping of fiscal year dates for a company or organization, and the sub query can be executed as part of application of the declarative rule. Data returned from the sub query can be used to generate restrictions to be applied to the received user query, to retrieve data from calendar year data sets that are required for generating query results. The use of configuration tables and sub queries in declarative rules can enable the shipping of generic filter rules with an application or system, with an administrator populating the configuration tables after the system has been installed, according to a data organization used for the installation.

Figure 4:
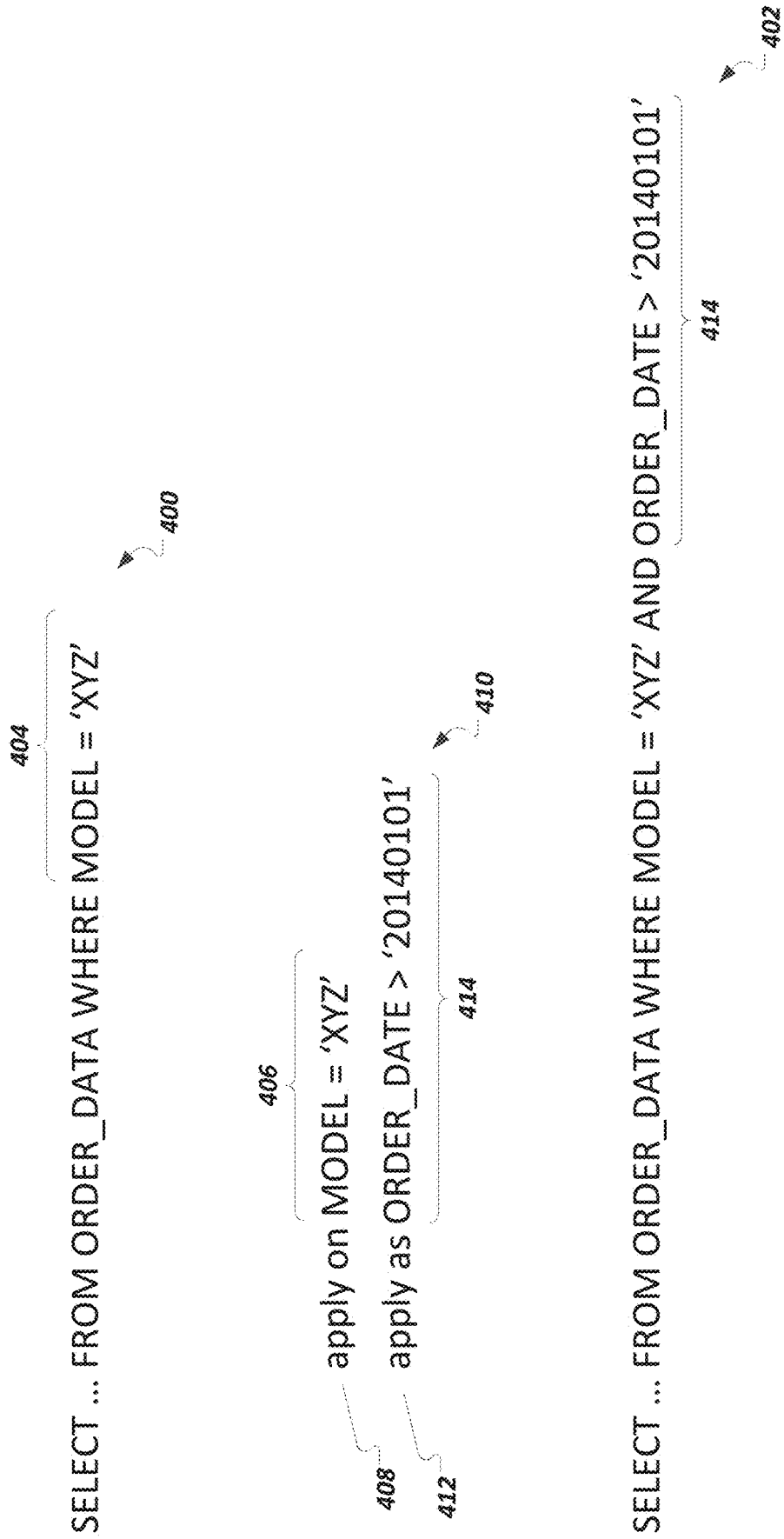

FIG. 4 illustrates a user query 400 that is transformed into an updated query 402 using a declarative rule, and specifically, a filter rule. A predicate 404 included in the user query 400 matches a predicate 406 included in an apply-on clause 408 of a filter creation statement 410 (partially shown). The predicate 404 is "MODEL='XYZ'". An administrator can configure the filter creation statement 410 to define a filter that includes an apply-as clause 412 to specify that a predicate 414 of "ORDER_DATE>'20140101'" is to be added to a user query (such as the user query 400) that includes the predicate 406. The administrator can define the rule based on domain knowledge that items of model 'XYZ' were not produced before the year 2014, for example. The updated query 402 includes a predicate 416 corresponding to the predicate 414. The updated query 402 can be executed more efficiently than the user query 400, since data prior to the year 2014 is not needlessly searched.

Although the order date of '20140101' is hard coded in the apply-as clause 412, the filter can be defined to use a sub query to look up, in a configuration table, when cars for the 'XYZ' model were first produced. The result of executing the sub query can be used to complete the apply-as clause 412, at run time.

Figure 5:
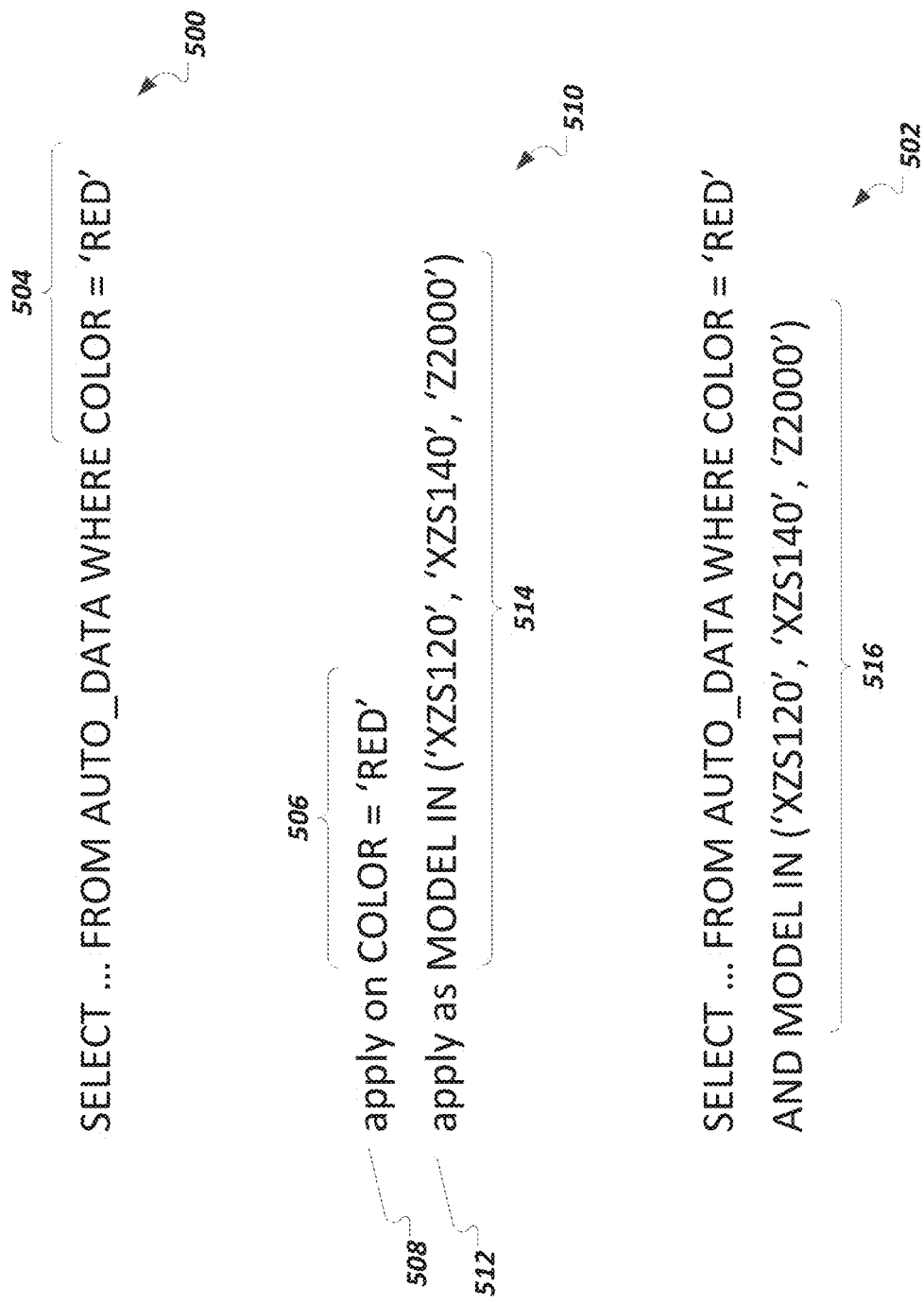

FIG. 5 illustrates a user query 500 that is transformed into an updated query 502 using a filter. A predicate 504 included in the user query 500 matches a predicate 506 included in an apply-on clause 508 of a filter creation statement 510 (partially shown). The predicate 504 is "COLOR='RED'". An administrator can configure the filter creation statement 510 to define a filter that includes an apply-as clause 512 to specify that a predicate 514 of "MODEL IN ('ZS120', 'XZS140', 'Z2000')" is to be added to a user query (such as the user query 500) that includes the predicate 506. The administrator can define the rule based on domain knowledge that only certain automobile models come in the color red, for example. The updated query 502 includes a predicate 516 corresponding to the predicate 514. The updated query 502 can be executed more efficiently than the user query 500, since data for models that are known to not come in red is not searched.

Although the model numbers are hard coded in the predicate 514, the filter can be defined to use a sub query to look up, in a configuration table, which models are produced in a given color, such as red. The result of executing the sub query can be used to complete the apply-as clause 512, at run time.

FIG. 6 illustrates a user query 600 that is transformed into an updated query 602 using a filter. A filter can be configured to apply when a query such as the user query 600 includes a predicate 604 of "MODEL='XYZ'" and a predicate such as a compound predicate 606 that includes one or more relational tests using an ORDER_DATE field. An administrator can configure a filter creation statement (not shown) so that a modification is made to queries that include the "MODEL='XYZ'" predicate so that expressions including ORDER_DATE reflect a fact that the XYZ model was not produced until the year 2014. For example, the user query 600 includes an unnecessarily broad clause 608 that refers to the year 2013. The filter, when applied, can modify the clause 608 such as shown in a clause 610 in the updated query 602, so that records with order dates prior to the year 2014 are not unnecessarily searched.

Figure 7:
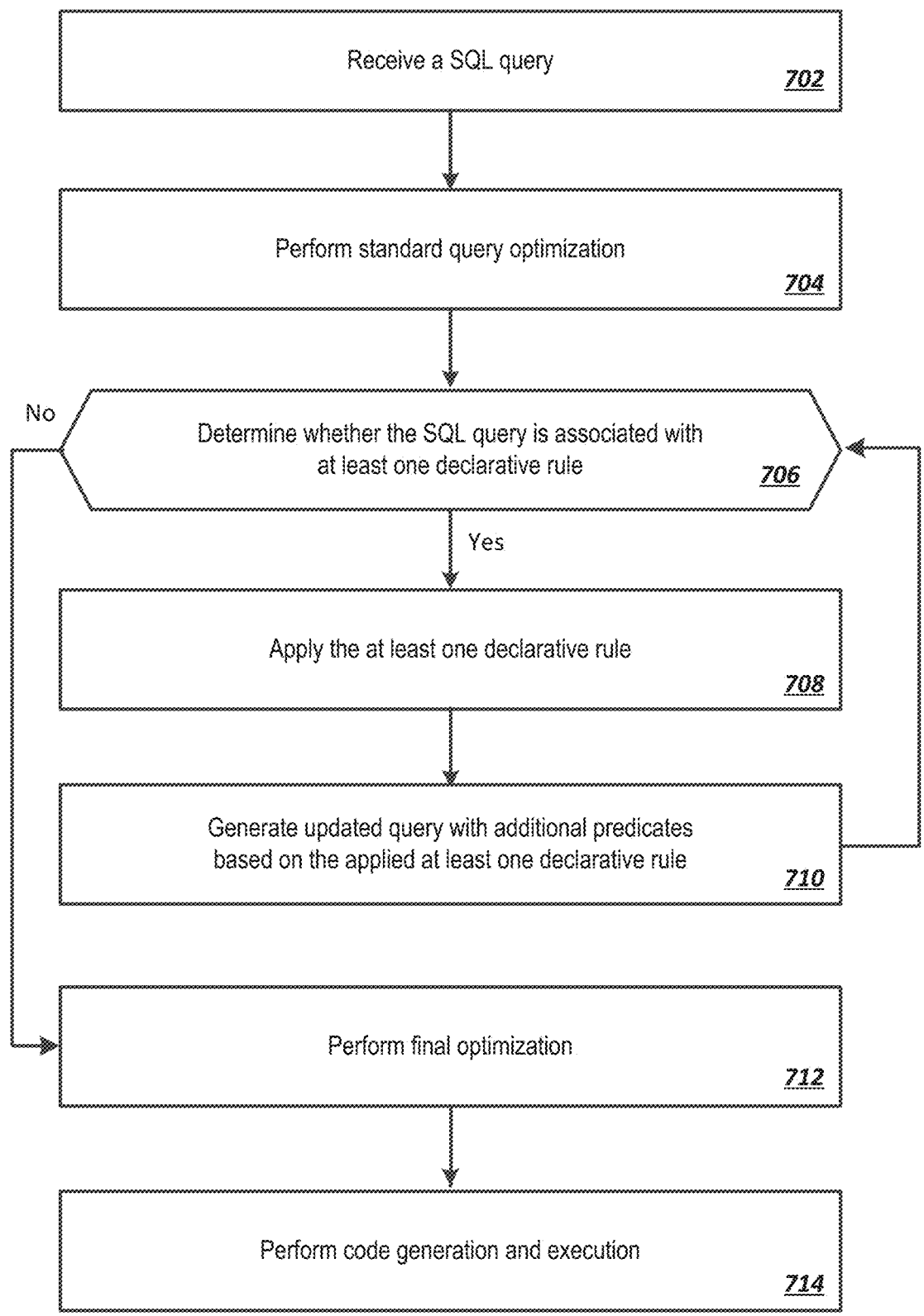
FIG. 7 is a flowchart of an example method for using declarative rules for optimized access to data.

FIG. 7 is a flowchart of an example method 700 for using filter rules for optimized access to data. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the declarative rule optimization module 126 of FIG. 1.

At 702, a SQL query is received. The SQL query can be received from a user or an application. The SQL query is associated with at least one database table and at least one first predicate. The SQL query can include one or more parameters, which can be resolved to actual values at run time.

At 704, standard query optimization is performed. Standard query optimization can include, for example, creating an internal representation of the query, identifying objects included in the query, and creating an internal representation of the query, such as a tree of objects (e.g., abstract syntax tree) and relationships between objects. Standard optimization processes can be performed on the tree objects, such as heuristically restructuring the query tree, cost-based reordering of query operators, operator fusion, among others.

At 706, a determination is made as to whether the SQL query is associated with at least one declarative rule, based on the at least one database table and the at least one first predicate. For example, a determination can be made that the at least one database table matches one or database tables included in a declarative rule and the at least one first predicate matches one or more predicates included in the declarative rule.

At 708, in response to determining that the SQL query is associated with at least one declarative rule, the at least one declarative rule is applied. The at least one declarative rule can be applied as part of query optimization. The at least one declarative rule defines a first transformation to the SQL query to be performed during query optimization.

At 710, an updated SQL query is generated, based on the applied at least one associated declarative rule. The updated SQL query can include additional predicates that were not included in the received SQL query. Iterative processing can be performed, at 706, to determine whether the updated SQL query is associated with at least one other declarative rule. For example, a determination can be made that one or more additional predicates that were included in the updated SQL query as a result of applying the at least one declarative rule match at least one other declarative rule. When the updated SQL query is associated with at least one other declarative rule, the at least one other declarative rule is applied (at 708) and a further updated query is generated (at 710). Iteration continues until no declarative rules are associated with a most current, updated query.

When the SQL query (or a most current updated query) is not associated with at least one declarative rule (at 706), final optimization is performed, at 712, to the SQL query (or to the most current updated query), to generate a final query. Final optimization can include removing duplicate predicates, condensing overlapping or nested ranges, and selecting exact (e.g., physical) operators to use for the final query.

At 714, code generation and execution is performed, using the final query. Code execution of the final query is generally more efficient than code execution of the received SQL query, due to application of the at least one declarative rule.

As described above, a declarative rule can be a join rule. A join rule can be used to propagate a restriction that is defined for one table to one or more other related tables. A join rule can be used to define a linkage between the related tables. A join rule can be used to propagate a filter condition that reduces the input of one node in the query plan to also another node, thereby making the overall query execution more efficient.

For example, two tables might be used to store invoice data in a header/line item manner, with one table containing the header (e.g. customer data and an invoice ID (identifier)), while the other table contains the line items with an invoice ID referencing the header table entry, and the information for the line items. Complete invoices are then reconstructed by a relational join between the two tables, with a particular invoice ID as a join predicate. If there is a semantic connection between the two tables (e.g. customer "X" may only order specific kinds of line items "Y"), filter predicates on the header can be propagated using join rules, thereby allowing additional filters to be applied on the line item table—making query processing potentially more efficient. The join rule can refer to both the header and line items tables. An apply-on clause can include the join predicate and an apply-as clause can include the filter predicate that is to be propagated from the header table to the line item table.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor, the method comprising:
    receiving a structured query language (SQL) query, the SQL query associated with at least one database table and at least one first predicate;
    determining whether the SQL query is associated with at least one declarative rule based on the at least one database table and the at least one first predicate;
    in response to determining that the SQL query is associated with at least one declarative rule:
        applying, during optimization of the SQL query, the at least one associated declarative rule, wherein the at least one declarative rule defines a first transformation to the SQL query to be performed during query optimization and wherein the first transformation includes a modification to the first predicate that reduces a search set searched by the SQL query by removing at least one irrelevant search area that has been predetermined to not include data relating to the first predicate and maintaining at least one maintained search area that has been predetermined to include data relating to the first predicate, and wherein the applying includes:
            identifying, in a first declarative rule, a sub query that is configured to query a configuration table to determine the modification to the first predicate;
            automatically executing the sub query to determine the modification to the first predicate; and
            generating an updated SQL query based on the applied at least one associated declarative rule, including transforming the SQL query by applying the modification to the first predicate; and
    executing the updated SQL query including searching the at least one maintained search area and not searching the at least one irrelevant search area.

2. The method of claim 1, further comprising performing further optimization to the updated SQL query.

3. The method of claim 1, further comprising:
    determining that the updated SQL query includes at least one new second predicate that is associated with at least one other declarative rule;
    applying the at least one other associated declarative rule, wherein the at least one other declarative rule defines a second transformation to the updated SQL query to be performed during the query optimization;
    generating a further updated SQL query based on the applied at least one other declarative rule; and
    providing the further updated SQL query.

4. The method of claim 3, wherein the at least one new second predicate is added to the updated SQL query during the first transformation.

5. The method of claim 1, wherein the at least one declarative rule comprises a filter rule, the filter rule specifying at least one third predicate.

6. The method of claim 5, wherein determining that the SQL query is associated with at least one declarative rule comprises determining that the at least one first predicate matches the at least one third predicate.

7. The method of claim 6, wherein the at least one third predicate is more restrictive than the at least one first predicate.

8. The method of claim 1, wherein the at least one declarative rule comprises a join rule, the join rule specifying a linkage between a first table and a second table, and wherein application of the join rule comprises applying a filter predicate associated with the first table to both the first table and the second table.

9. The method of claim 5, wherein the filter rule represents information about data aging and the at least one third predicate indicates aged data to search based on the first predicate.

10. The method of claim 1, wherein the updated SQL query is provided to a query execution engine, the method further comprising executing the updated query to generate query results.

11. The method of claim 10, wherein the query results are provided to a user or application associated with the received SQL query.

12. The method of claim 11, wherein the query results are provided to the user or the application associated with the received SQL query without presentation of the updated SQL query to the user or the application.

13. A system, comprising:
    at least one processor; and
    a memory communicatively coupled to the at least one processor, the memory storing instructions which, when executed by the at least one processor, cause the at least one processor to perform operations comprising:
        receiving a structured query language (SQL) query, the SQL query associated with at least one database table and at least one first predicate;
        determining whether the SQL query is associated with at least one declarative rule based on the at least one database table and the at least one first predicate;
        in response to determining that the SQL query is associated with at least one declarative rule:
            applying, during optimization of the SQL query, the at least one associated declarative rule, wherein the at least one declarative rule defines a first transformation to the SQL query to be performed during query optimization and wherein the first transformation includes a modification to the first predicate that reduces a search set searched by the SQL query by removing at least one irrelevant search area that has been predetermined to not include data relating to the first predicate and maintaining at least one maintained search area that has been predetermined to include data relating to the first predicate, and wherein the applying includes:
                identifying, in a first declarative rule, a sub query that is configured to query a configuration table to determine the modification to the first predicate;
                automatically executing the sub query to determine the modification to the first predicate; and
                generating an updated SQL query based on the applied at least one associated declarative rule, including transforming the SQL query by applying the modification to the first predicate; and
        executing the updated SQL query including searching the at least one maintained search area and not searching the at least one irrelevant search area.

14. The system of claim 13, the operations further comprising performing further optimization to the updated SQL query.

15. The system of claim 13, wherein the at least one declarative rule comprises a filter rule, the filter rule specifying at least one third predicate.

16. The system of claim 15, wherein determining that the SQL query is associated with at least one declarative rule comprises determining that the at least one first predicate matches the at least one third predicate.

17. One or more computer-readable media storing instructions which, when executed by at least one processor, cause the at least one processor to perform operations comprising:
   receiving a structured query language (SQL) query, the SQL query associated with at least one database table and at least one first predicate;
   determining whether the SQL query is associated with at least one declarative rule based on the at least one database table and the at least one first predicate;
   in response to determining that the SQL query is associated with at least one declarative rule:
      applying, during optimization of the SQL query, the at least one associated declarative rule, wherein the at least one declarative rule defines a first transformation to the SQL query to be performed during query optimization and wherein the first transformation includes a modification to the first predicate that reduces a search set searched by the SQL query by removing at least one irrelevant search area that has been predetermined to not include data relating to the first predicate and maintaining at least one maintained search area that has been predetermined to include data relating to the first predicate, and wherein the applying includes:
         identifying, in a first declarative rule, a sub query that is configured to query a configuration table to determine the modification to the first predicate;
         automatically executing the sub query to determine the modification to the first predicate; and
         generating an updated SQL query based on the applied at least one associated declarative rule, including transforming the SQL query by applying the modification to the first predicate; and
   executing the updated SQL query including searching the at least one maintained search area and not searching the at least one irrelevant search area.

18. The computer-readable media of claim 17, the operations further comprising performing further optimization to the updated SQL query.

19. The computer-readable media of claim 17, wherein the at least one declarative rule comprises a filter rule, the filter rule specifying at least one third predicate.

20. The computer-readable media of claim 19, wherein determining that the SQL query is associated with at least one declarative rule comprises determining that the at least one first predicate matches the at least one third predicate.

* * * * *